April 1, 1958 A. J. BARACKET ET AL 2,829,199

LIGHT ENERGY TO VIDEO SIGNAL TRANSDUCING SYSTEM

Filed July 16, 1953

INVENTORS
ALBERT J. BARACKET
SYLVESTER A. DeMARS
BY Percy P. Lantzy
ATTORNEY

United States Patent Office 2,829,199

Patented Apr. 1, 1958

2,829,199

LIGHT ENERGY TO VIDEO SIGNAL TRANSDUCING SYSTEM

Albert J. Baracket, Bloomfield, and Sylvester A. De Mars, Ridgewood, N. J., assignors to International Telephone and Telegraph Corporation, a corporation of Maryland Application July 16, 1953, Serial No. 368,302

5 Claims. (Cl. 178—7.7)

Figure 1:
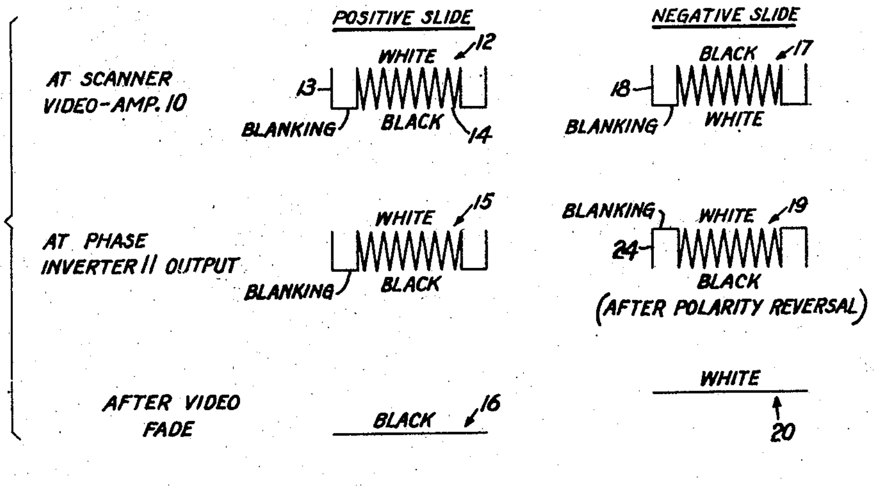

This invention relates to television programming facilities and more particularly to a light energy to video signal transducing system capable of developing a picture signal and the blanking component therefor having the same relative polarity relationships therebetween for either positive or negative characteristic transparencies.

Light energy to video signal transducing systems include as transducers or converters therein flying spot scanners and D. C. transmitting type camera systems such as the image orthicon and the vidicon, whose purpose is to translate light intensity variations to an electrical signal output. The flying spot scanner incorporates the scanning light energy emitted from the screen of a cathode ray tube for passage through a transparency having transparent and opaque portions constituting the image or images for televising. As the light spot scans the transparency, it is intensity modulated in accordance to the transparent and opaque portions thereof, said modulation being recognized by a light responsive means, such as a photo-cell or photomultiplier, for translation to an electrical signal representative of the view being scanned.

The D. C. transmitting type camera systems on the other hand receive intensity modulated light energy from an object upon its photoconductive face which likewise functions to translate this intensity modulation to an electrical signal representative of the object being viewed by the camera. The camera may receive the intensity modulation by light reflection from an object as in the case of a "live" program, or the intensity modulated light may be achieved by passing light energy through a transparency, this latter type of signal production being of primary concern in the application of this invention.

To enable the insertion of synchronizing information into the television video signal at a latter point in a television transmitting system, it is necessary to blank the operation of both types of transducing systems at the time corresponding to the end of each line and again at the end of each field. This blanking of the transducing system thereby results in a video signal output therefrom including a picture signal component and an associated blanking signal component. As long as the transparencies employed, slides or film, are photographic positives, no complications will arise when the video signal is faded to the "black" negative signal level, the desired clamping level as established by the blanking component, to achieve desired special effects. However, if a photographic negative transparency is employed the relative position of the "black" and "white" signal levels will be reversed and the blanking component related thereto will have the wrong polarity resulting in a video fade to the "white" positive signal level, or undesired clamping level as determined by the positive polarity of the blanking component, rather than a video fade to the "black" negative signal level as is called for by universal programming techniques.

Heretofore, it has been the practice to employ only positive type transparencies with the present transducing systems, or if it became necessary to employ a negative type transparency then excessive control manipulation is necessary to overcome the hereinabove mentioned difficulty. Those skilled in the art will recognize the time saved and the labor expense saved, if the step of producing a positive transparency could be eliminated by enabling the direct employment of a negative transparency for achieving a transmission of the view contained thereon equivalent to the transmission of the same view appearing on a positive transparency. It will further be recognized that the handling of a slide or film program will be facilitated if the pedestal control could remain set at a single predetermined position when positive and negative transparencies are used interchangeably.

Therefore, it is an object of this invention to provide a light energy to video signal transducing system for satisfactory transparency program presentation without excessive control manipulation when positive and negative transparencies are interchanged.

Another object of this invention is to provide in a light energy to video signal transducing system a means to enable the fading of a video signal to a given reference level regardless of whether said video signal is derived from a positive or negative type of transparency.

A feature of this invention is the provision of a control circuit in a light energy to video signal transducing system including a light energy to video signal transducer, a source of blanking signals disposed in a predetermined manner to control the blanking of said transducer and to simultaneously insert a blanking pulse therefrom of proper polarity and magnitude into the electrical signal output of said transducer to enable the desired fading to "black" negative of a video signal derived from either a positive or negative transparency.

A further feature of this invention is the selective insertion of a blanking pulse having a predetermined amplitude and given polarity into the video signal resulting from a light energy to video signal transducer when the video signal in question is derived from a negative type transparency for substantially cancelling the blanking component derived therefrom to enable the referencing of the picture signal to a negative clamping level during a fading operation thereof.

Figure 2:
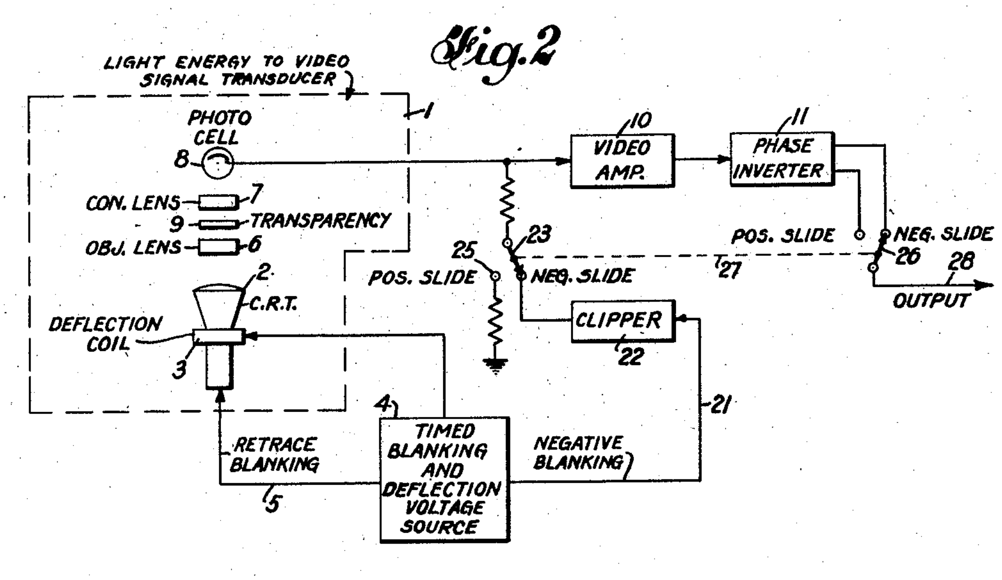

The above-mentioned and other features and objects of this invention will become more apparent by reference to the following description taken in conjunction with the accompanying drawings, in which;

Fig. 1 graphically illustrates the difficulties encountered in interchanging positive and negative types of transparencies in light energy to video signal transducing system; and Fig. 2 illustrates in block form an embodiment of a light energy to video signal transducing system in accordance with the principles of this invention to overcome the difficulties illustrated by Fig. 1.

Referring to the drawings, there is illustrated in Fig. 1 waveforms appearing at various points in a light energy to video signal transducing system when the video signal is derived from a positive and a negative slide showing the respective relative polarity between the components thereof, the reversal thereof between negative and positive transparency necessitating the modification of said transducing system in accordance with the principles of this invention to enable the successful operation thereof when running positive and negative slides interchangeably without excessive control manipulation. Fig. 2 illustrates in block form, for purpose of explanation, an electronic flying spot scanner type of light energy to video signal transducer 1 including in combination therewith a control means following the principles of this invention which enables the successful operation of a flying spot scanner and associated special effects circuitry as called for by accepted universal programming techniques when employing both positive and negative transparencies by appropriately positioning a single selective panel control. It must be remembered, however, that the principles and structures herein described with respect to a flying spot scanner will apply in a like manner to any D. C. transmitting type camera systems.

Video signals including a picture component and a blanking component are derived from the projection system of a flying spot scanner of an electronic type including a cathode ray tube 2 having means therein to produce an electron beam and a phosphor screen excited by said electron beam for emission of light energy. The electron beam of cathode ray tube 2 is caused to be deflected in a predetermined manner by the deflection system 3 activated by deflection voltages from source 4, said electron beam being scanned vertically and horizontally thereby and caused to be blanked at the end of each scanning line and at the end of each scanning field by the retrace blanking pulse conducted along conductor 5. The retrace blanking pulse may be applied to the cathode or to the control grid of cathode ray tube 2 dependent upon the polarity of the blanking pulse emitted by source 4, or other design considerations, such that the passage of the electron beam will be interrupted during its retrace period and provides the proper positioning of the blanking component in the video signal.

The light energy developed on the screen of tube 2 is projected by means of the objective lens 6 and the condensing lens 7 to the photo-cell 8. This projection of the light energy causes the flying spot of light to scan an object such as the transparency 9, disposed intermediate screen 2 and photo-cell 8, having thereon opaque and transparent portions which intensity modulates the light energy in accordance with the view defined by these opaque and transparent portions. Photo-cell 8 receives the intensity modulated light energy and converts this light energy into a video signal including therein an electric signal representative of the view contained on transparency 9 and a blanking component is inserted by the blanking of the cathode ray tube 1 through means of the retrace blanking signal.

Photo-cell 8 normally is a photomultiplier which functions to amplify the converted electric energy, the output of which is coupled to a video amplifier 10 for further amplification and hence to a phase inverter 11 which enables the coupling therefrom of the video or electric signal having either a positive or negative sense.

The circuitry of the flying spot scanner described hereinabove functions without mishap when transparency 9 is a photographic positive which presents at the output of video amplifier 10 a signal as illustrated by waveform 12 in Fig. 1. It will be observed in waveform 12 that the blanking component 13 and the "black" level 14 of the picture signal have the same relative polarity and as this signal passes to the output of phase inverter 11 the blanking component and the "black" signal level still maintain the same relative polarity as indicated by waveform 15. Since it is required by universal programming techniques to be able to fade the video signal to the "black" negative reference level, the video signal as derived from a positive transparency can be faded to "black" without any appreciable control manipulation, as indicated at 16 of Fig. 1, since this type of equipment is normally designed to develop this polarity relationship from positive transparencies.

However, when attempting to employ a transparency 9 having a photographic negative characteristic trouble is encountered when attempting to fade the picture signal to the "black" negative level, since the "white" signal level corresponds to the opaque portions of the negative type of transparency and the blanking component due to the extinction of the cathode ray tube beam will also have the same polarity as the opaque areas, or the "white" signal level, thereby establishing a positive or "white" level clamping reference. This difficulty is illustrated in Fig. 1 by waveform 17 where the video signal presented at the output of video amplifier 10 includes a blanking component 18 having the same relative polarity as the "white" level of the picture signal, or in other words, a reversed polarity relationship with respect to the "black" level of the picture signal. By selecting the appropriate output of phase inverter 11 a polarity reversal will be achieved to provide a picture signal with a "black" negative signal level as illustrated in waveform 19. However, the blanking component of waveform 19 still has the same polarity as the "white" level of the picture signal. In attempting to fade the video signal, the video signal will be faded to the "white" level due to the positive clamping level established by the blanking component as indicated at 20.

To overcome this reversed fading of the picture signal it would be necessary to manipulate controls, particularly the pedestal control, to enable the video signal derived from the negative type transparency to be faded to a "black" negative level. However, by extracting from source 4 a negative blanking pulse and conducting this pulse along conductor 21 through clipper 22 and an appropriately positioned switch 23 it is possible to overcome the above described difficulty. By assuring that the negative blanking pulse coupled to switch 23 has an amplitude just sufficient to cancel the blanking component 24 of waveform 19 in Fig. 1, it would be possible to return the clamping level, or blanking component polarity, to the "black" negative level of the picture signal. This is accomplished by the insertion at the input to video amplifier 10 a negative blanking pulse at predetermined amplitude to cancel blanking pulse carried by waveform 19 of Fig. 1 and thereby refers the D. C. clamping level to the "black" negative signal level when transparency 9 is of the negative type.

To enable the interchanging of positive and negative type transparencies, slides or films, there is provided a means to interrupt the introduction of the inverted blanking pulse by means of switch 23. When deriving the video signal from a positive type transparency switch 23 is positioned to make contact with contact 25 which interrupts the blanking insertion and at the same time through a ganging or interconnecting arrangement 27 positions switch 26 in a manner enabling the removal of the resultant video signal from the cathode output of the phase inverter 11. By appropriate operation of the ganged switches 23 and 26 it is possible to present at the output 28 identical video signals having the same relative polarity relationship between the blanking and picture components thereof for video signals derived from both positive and negative transparencies, eliminating the resetting of the pedestal control to handle the interchanging of positive and negative types of transparency.

Clipper 22 of the control means of this invention enables the maintenance of the inserted blanking pulse at a predetermined constant amplitude in spite of variations in the signal emitted from source 4 thereby divorcing the efficient operation of the flying spot scanner incorporating the control means of our invention from amplitude variations resulting in source 4.

It should be further recognized that the blanking insertion may occur at points within the transducing system other than the one indicated as long as the polarity and amplitude thereof are properly selected. For instance, the blanking pulse may be inserted at the anode output of the first stage of amplifier 10 as long as the polarity thereof is positive and has an amplitude sufficient to cancel the derived blanking pulse 13 which will of course have a positive polarity following one stage of amplification.

While we have described above the principles of our invention in connection with specific apparatus, it is to be clearly understood that this description is made only by way of example and not as a limitation to the scope of our invention as set forth in the objects thereof and in the accompanying claims.

We claim:

1. A light energy-to-video signal transducing system comprising a light energy-to-electrical energy converter, means to produce a scanning light beam directed along a path toward said converter, a source of blanking wave energy, means coupled to said source to periodically blank said beam to produce a blanking signal component in the video output of said converter, means to dispose an object in said path to produce by intensity modulation of said beam a picture signal component in the video output of said converter, the signal components of said video output having a first relative polarity relationship with respect to said blanking signal component when said object is of the photographic positive type and a second relative polarity relationship with respect to said blanking signal component opposite to said first relative polarity relationship when said object is of the photographic negative type, and a selective control circuit coupled to the output of said converter to convert the second relative polarity relationship of said video output produced by an object of the negative type to said first relative polarity relationship, said selective control circuit including means to selectively couple a pulse of given magnitude and polarity to the output of said converter to cancel the blanking signal component of said video signal and means selectively coupled to the output of said converter to invert the resultant video signal.

2. A light energy-to-video signal transducing system comprising a light energy-to-electrical energy converter, means to produce a scanning light beam directed along a path toward said converter, a source of blanking wave energy, means coupled to said source to periodically blank said beam to produce a blanking signal component in the video output of said converter, means to dispose an object in said path to produce by intensity modulation of said beam a picture signal component in the video output of said converter, the signal components of said video output having a first relative polarity relationship with respect to said blanking signal component when said object is of the photographic positive type and a second relative polarity relationship with respect to said blanking signal component opposite to said first relative polarity relationship when said object is of the photographic negative type, and a selective control circuit coupled to the output of said converter to convert the second relative polarity relationship of said video output produced by an object of the negative type to said first relative polarity relationship, said selective control circuit including means to selectively couple an output of said source of blanking wave energy having a given magnitude and polarity to the output of said converter to cancel the blanking signal component of said video signal and inverter means selectively coupled to the output of said converter to invert the resultant video signal.

3. A light energy-to-video signal transducing system comprising a light energy-to-electrical energy converter, means to produce a scanning light beam directed along a path toward said converter, a source of blanking wave energy, means coupled to said source to periodically blank said beam to produce a blanking signal component in the video output of said converter, means to dispose an object in said path to produce by intensity modulation of said beam a picture signal component in the video output of said converter, the signal components of said video output having a first relative polarity relationship with respect to said blanking signal component when said object is of the photographic positive type and a second relative polarity relationship with respect to said blanking signal component opposite to said first relative polarity relationship when said object is of the photographic negative type, and a selective control circuit coupled to the output of said converter to convert the second relative polarity relationship of said video output produced by an object of the negative type to said first relative polarity relationship, said selective control circuit including means to selectively couple a negative blanking pulse of given magnitude from said source of blanking wave energy to the output of said converter to cancel the blanking signal component of said video signal and a phase inverter coupled to the output of said converter to invert the resultant video signal.

4. A light energy-to-video signal transducing system comprising a light energy-to-electrical energy converter, means to produce a scanning light beam directed along a path toward said converter, a source of blanking wave energy, means coupled to said source to periodically blank said beam to produce a blanking signal component in the video output of said converter, means to dispose an object in said path to produce by intensity modulation of said beam a picture signal component in the video output of said converter, the signal components of said video output having a first relative polarity relationship with respect to said blanking signal component when said object is of the photographic positive type and a second relative polarity relationship with respect to said blanking signal component opposite to said first relative polarity relationship when said object is of the photographic negative type, an output means for said transducing system, a phase inverter having two outputs coupled to the output of said converter, one of the outputs of said inverter providing a replica of the output of said converter and the other of the outputs of said inverter providing an inverted replica of the output of said converter, a first switch to couple said one output of said inverter to said output means when a photographic positive is in said path and to couple said other output of said inverter to said output means when a photographic negative is in said path, and a second switch to couple a negative blanking signal of given magnitude from said source of blanking wave energy to the output of said converter to cancel the blanking signal component of said video signal when a photographic negative is in said path.

5. A light energy-to-video signal transducing system comprising a light energy-to-electrical energy converter, means to produce a scanning light beam directed along a path toward said converter, a source of blanking wave energy, means coupled to said source to periodically blank said beam to produce a blanking signal component in the video output of said converter, means to dispose an object in said path to produce by intensity modulation of said beam a picture signal component in the video output of said converter, the signal components of said video output having a first relative polarity relationship with respect to said blanking signal component when said object is of the photographic positive type and a second relative polarity relationship with respect to said blanking signal component opposite to said first relative polarity relationship when said object is of the photographic negative type, an output means for said transducing system, a phase inverter having two outputs coupled to the output of said converter, one of the outputs of said inverter providing a replica of the output of said converter and the other of the outputs of said inverter providing an inverted replica of the output of said converter, a first switch to couple said one output of said inverter to said output means when a photographic positive is in said path and to couple said other output of said inverter to said output means when a photographic negative is in said path, and a second switch to couple a negative blanking signal of given magnitude from said source of blanking wave energy to the output of said converter to cancel the blanking signal component of said video signal when a photographic negative is in said path, said first and second switch being ganged together.

References Cited in the file of this patent

UNITED STATES PATENTS

| | | |
|---|---|---|
| 2,286,450 | White et al. | June 16, 1942 |
| 2,301,374 | Cox | Nov. 10, 1942 |
| 2,535,610 | Thompson | Dec. 26, 1950 |
| 2,735,333 | Mitchell | Feb. 21, 1956 |

OTHER REFERENCES

Ultrafax RCA Review, March 1949, vol. X, No. 1, page 105.